Nov. 29, 1949  H. J. DE N. McCOLLUM  2,489,716
INTERNAL-COMBUSTION HEATER WITH PILOT BURNER
Filed Jan. 12, 1946
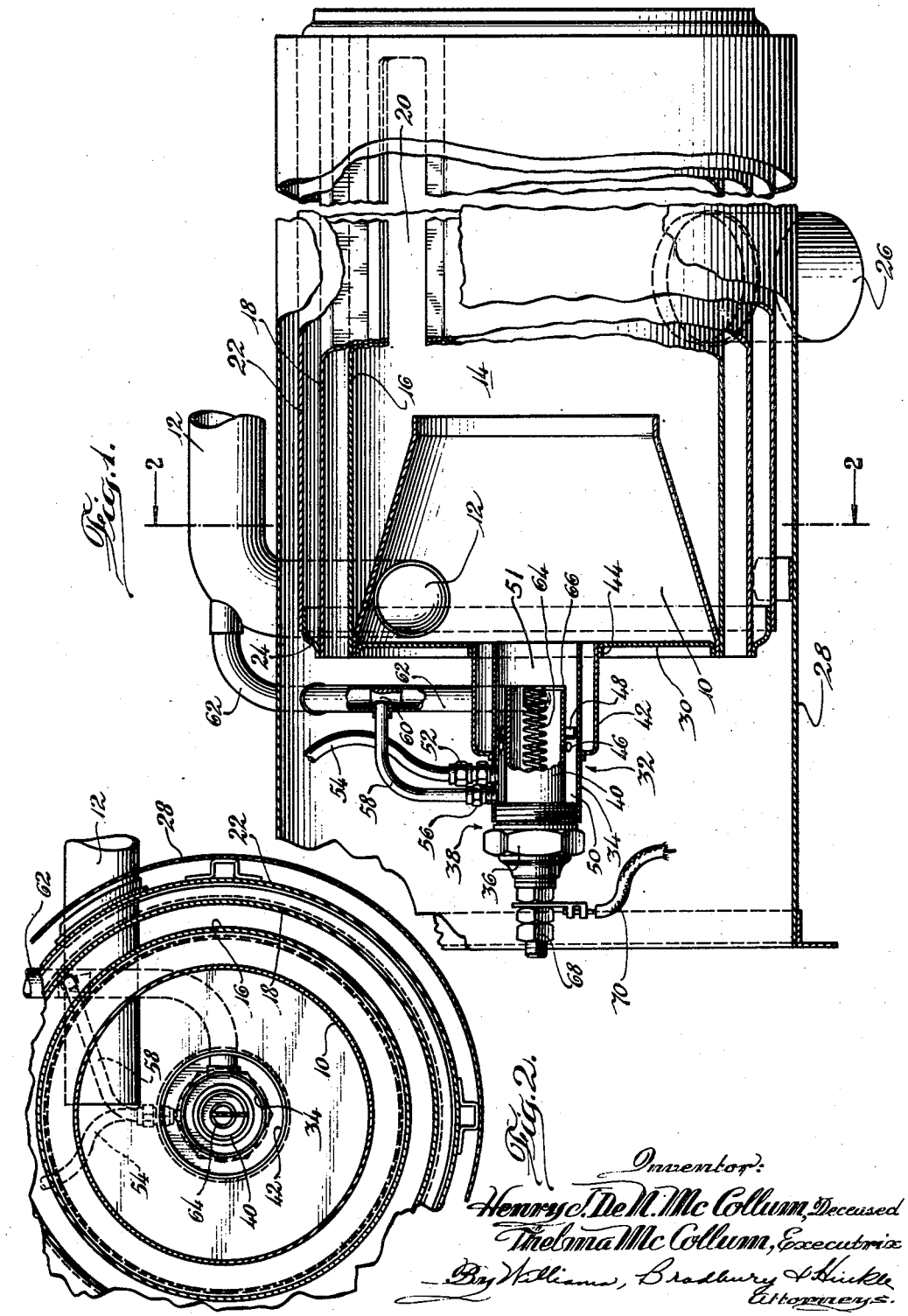

Patented Nov. 29, 1949

2,489,716

UNITED STATES PATENT OFFICE 2,489,716

INTERNAL-COMBUSTION HEATER WITH PILOT BURNER

Henry J. DeN. McCollum, deceased, late of Chicago, Ill., by Thelma McCollum, executrix, Chicago, Ill., assignor to Stewart-Warner Corporation, Chicago, Ill., a corporation of Virginia Application January 12, 1946, Serial No. 640,721

5 Claims. (Cl. 158—28)

1

The present invention relates to heaters and, more particularly, combustion heaters of the aircraft type.

One of the principal difficulties with aircraft heaters of the combustion type is they are likely to be extremely difficult to start at high altitude. For instance, most of the heaters have bad starting characteristics above an altitude of about 25,000 feet.

It is one of the principal objects of the present invention to provide an improved aircraft combustion type heater which can be started at extremely high altitudes.

Yet another object of the present invention is to provide a novel aircraft heater having the above characteristics and which does not sacrifice any desirable low altitude characteristics in order to obtain high altitude starting.

Yet another object of the present invention is to provide a novel high altitude aircraft heater of the combustion type which can be manufactured at relatively low cost, which is simple in construction, and which is not likely to require extensive maintenance in service.

Other objects and advantages will become apparent from the following description of a preferred embodiment of the invention.

In the drawings in which similar characters of reference refer to similar parts in both the views:

Fig. 1 is a longitudinal sectional view of an aircraft heater embodying the present invention; and Fig. 2 is a transverse sectional view which may be considered as taken in the direction of the arrows substantially along the line 2—2 of Fig. 1.

The heater shown comprises a conical chamber forming a main burner 10 having a tangentially positioned air induction tube 12. This tube 12 may lead to a ram on the exterior of the airplane or to some other source of air under pressure which can be used for combustion. The air entering the main burner through the tube 12 swirls around within the burner and leaves at the smaller end of the cone and passes into a combustion space 14 enclosed by a cylindrical shell 16. This shell is in turn surrounded by a second shell 18 spaced therefrom around most of the circumference of the two shells. A portion of the shell 18, however, is bent inwardly against the shell 16 along the major portion of the length of the two shells. At this point, a slot 20 is formed through the two shells to connect the space 14 with the space outside the shell 18. Gases passing through this slot are prevented from leaking

2 into the space between the shells 16 and 18 by a seam weld extending completely around the slot 20, thereby sealing the shells 16 and 18 together. A third shell or sleeve 22 surrounds the shell 18 and is spaced therefrom excepting at its ends, the ends being welded to an adapter ring 24 which is also welded to the shell 18 so as to enclose a space between these two shells. At a point approximately opposite the slot 20 the space between shells 18 and 22 communicates with an exhaust fitting 26 secured to the shell 22. All of the above are enclosed within a cylindrical case 28 through which air to be heated passes longitudinally, the air flowing between the case 28 and the shell 22 and through the slot between the shells 16 and 18.

At approximately the center of the combustion chamber end wall 30, fuel vapor is introduced by way of a vaporizer 32. This vaporizer comprises a tube or sleeve 34 threaded at one end to receive the head 36 of an igniter 38 of the hot wire type. This igniter has a cylindrical shell 40 somewhat smaller than the internal diameter of the sleeve 34 and which extends to within a short distance of the back wall of the combustion chamber. The right-hand portion of the sleeve 34 as seen in Fig. 1, that is, the portion away from the head 36, is jacketed for something more than half its length by a cup 42 welded to the sleeve 34 at one end while its opposite end is welded to a flange 44 formed in the end wall 30 of the combustion chamber 14 so that an annular passageway is formed between the sleeve 34 and cup 42 communicating with the main burner 10. Inside the cup 42 in a position adjacent the portion welded to the sleeve 34, the sleeve 34 has a row of perforations 46. A disk like baffle 48 with a flanged edge is located within the tube 34 and closely fits the igniter barrel 40. It is positioned between the plane of the perforations 46 and the end of the igniter and divides the space within the sleeve 34 surrounding the shell 40 into a liquid fuel receiving and vaporizing chamber indicated by the numeral 50 and a pilot burner chamber 51 adjacent the inner end of the igniter 38 and communicating with the main burner 10. This baffle is welded to the tube 34 and since it closely fits the igniter barrel 40, the gases flowing from the space 50 within the sleeve 34 and adjacent the igniter head 36, toward the burner 10 must pass outwardly through the perforations 46 into the annular passageway between the cup 42 and sleeve 34 and thence to the burner.

Adjacent its outer end, the portion of the sleeve 34 surrounding the space 50 is provided with a fuel inlet fitting 52 connected to a fuel line 54 leading to a source of fuel under pressure. Closely adjacent the fitting 52, the sleeve 34 is provided with a second fitting 56 connected to a fuel vapor line 58 leading to the throat of a venturi 60 in a by-pass tube 62. This by-pass tube is connected at one end to the main air induction tube 12 and at its opposite end communicates with the pilot burner chamber 51 in the inner end of the sleeve 34.

Inside the shell 40, the igniter 38 is provided with a heating coil 64 of Nichrome or similar material, one end of which is grounded, as at 66, while the other end is connected to an insulated terminal 68, this terminal in turn being connected to a source of electric energy by means of a wire 70. The resistance of the coil 64 is such that when the igniter is energized this coil operates at a temperature sufficiently high to ignite a mixture of gasoline vapor and air.

The device operates in the following manner. Whenever the heater is turned on, that is, by energizing the electrical circuit to the igniter 38, by causing air to flow through the induction tube 12, by supplying fuel under pressure to the line 54 and by passing ventilating air through the case 28, the following takes place. The igniter coil 64 is quickly heated to red heat and therefore quickly raises the igniter shell 40 to a high temperature. Gasoline introduced through the line 54 passes over the hot shell 40 with the result that a portion of the gasoline is vaporized, even though the heater may be operating at extremely low ambient temperature. A portion of the vapor thus formed and the liquid fuel not vaporized pass outwardly through the perforations 46 into the annular passageway between the shell 42 and the sleeve 34 and reach the burner where they are mixed with air entering through the tangential combustion air tube 12. Meanwhile, a portion of the air passing through the tube 12 is diverted through the branch tube 62 and enters the pilot burner chamber 51 inside the shell 34 in a position adjacent the open end of the igniter. Also, the air passing through the venturi 60 produces a low pressure therein which causes a portion of the gasoline vapor to flow from the space 50, through the tube 58, and into the venturi 60 where it is mixed with the air flowing through the tube 62. The mixture thus formed in the tube 62 is comparatively rich and therefore easy to ignite. This mixture enters the shell 34 at a point adjacent the open end of the igniter 38 and is quickly ignited by the hot coil 64, thus producing a pilot flame within the end of the sleeve 34 which plays out into the combustion chamber 10. This pilot flame quickly warms the combustion chamber and ignites the main portion of the fuel vapor and liquid fuel passing into the combustion chamber through the annular passageway between the end of the shell 34 and the end of the cup 42, the vapor being mixed with air introduced through the pipe 12.

After heater operation has become well established, the igniter 38 may be de-energized. The igniter, therefore, cools so that it is no longer capable of vaporizing more than a small portion of the fuel supplied by the fuel line 54. It may remain warm, however, because of heat conducted back from the burner. Therefore, some vapor will be produced. This vapor passes through the perforations 46, as has been previously described, while the liquid fuel not vaporized in the chamber 50 flows through the lowermost of the perforations 46 and runs into the burner 10 along the lower portion of the annular passageway formed between the sleeve 34 and the cup 42. The burner, therefore, receives some liquid fuel from the mouth of the cup 42 at the lower edge, some vaporized fuel which is introduced completely around the mouth of the cup 42 and some of the fuel and air mixture which is introduced by way of the tube 62 and the open end of the sleeve 34. The liquid fuel flowing into the combustion chamber is quickly vaporized therein and is retained within the burner until vaporized by the upslanting lower surface of the conical burner. Fuel vapor, therefore, from all of the sources is intimately mixed with air introduced through the tube 12 to provide good burning characteristics in the burner.

It has been found that a burner as described above can be started readily at low altitudes, at extremely high altitudes and at extremely low temperatures, even though the main burner cannot be lighted under all of these conditions without the use of the pilot flame provided by the vaporizer.

Having described the invention, what is claimed as new and useful and desired to be secured by Letters Patent of the United States is:

1. A heater comprising a main burner, induction means for introducing combustion air into said burner tangentially to produce a swirling movement thereof, means forming a pilot burner chamber communicating with said main burner, an igniter communicating with said pilot burner chamber for igniting a combustible mixture therein, liquid fuel supply means, means forming a vaporizing chamber in heat exchange relation with a portion of said igniter but out of igniting relation therewith to vaporize a portion of the liquid fuel, said fuel supply means communicating with said vaporizing chamber; means communicating with said induction means and said pilot burner chamber for diverting a portion of the air flowing through said induction means to said pilot burner chamber, means communicating with said vaporizing chamber and said air diverting means for diverting a portion of the vaporized fuel to said air diverting means to produce a combustible mixture for combustion in said pilot burner chamber, and means forming a passageway from said vaporizing chamber to said main burner in heat exchange relation with said pilot burner chamber and having an outlet in a region past which the air from said induction means swirls when the heater is operating so that unvaporized fuel delivered to said main burner is vaporized by the swirling combustion air.

2. A heater comprising a main burner, induction means for introducing combustion air into said burner, means forming a pilot burner chamber communicating with said main burner, an igniter communicating with said pilot burner chamber for igniting a combustible mixture therein, liquid fuel supply means, means forming a vaporizing chamber in heat exchange relation with a portion of said igniter but out of igniting relation therewith to vaporize a portion of the liquid fuel, said liquid fuel supply means communicating with said vaporizing chamber; intercommunicating conduit forming means communicating with said air induction means, vaporizing chamber and pilot burner chamber for diverting a portion of the air from said induction means and at least a portion of the vaporized fuel from said vaporizing chamber to provide a combustible mixture for combustion in said pilot burner chamber, and means forming a fuel passageway in heat exchange relation with said pilot burner chamber for conveying unvaporized fuel and the balance of the vaporized fuel from said vaporizing chamber to said main burner.

3. A heater comprising a main burner, induction means for introducing combustion air into said main burner, means forming a pilot burner chamber communicating with said main burner, an igniter communicating with said pilot burner chamber for igniting a combustible mixture therein, means forming a fuel vaporizing chamber surrounding a portion of said igniter for receiving liquid fuel to vaporize a portion thereof, means for diverting a portion of the air flowing through said combustion air induction means to said pilot burner chamber, means communicating with said vaporizing chamber and air diverting means to supply at least a portion of the fuel vapor formed in said vaporizing chamber to said diverted air stream and thereby produce a combustible mixture for combustion in the pilot burner chamber, and means forming a fuel passageway surrounding said pilot burner chamber and establishing communication between said receiving and vaporizing chamber and said main burner for the flow of unvaporized fuel and the balance of said vaporized fuel to said main burner.

4. A heater comprising a pot type main burner, induction means for introducing combustion air tangentially into said main burner, means forming a pilot burner chamber adapted to discharge into said main burner, a combined heater and igniting element communicating with said pilot burner chamber for igniting a combustible mixture therein, liquid fuel supply means for said heater including means forming a vaporizing chamber in heat exchange relation with the portion of said heater external to said pilot chamber and out of igniting relation therewith for vaporizing a portion of the fuel supplied to said heater, means for diverting a portion of the air flowing through said combustion air induction means to said pilot burner chamber, means communicating with said vaporizing chamber and air diverting means to supply at least a portion of the fuel vapor formed in said vaporizing chamber to said diverted air stream and thereby produce a combustible mixture for combustion in said pilot burner chamber, and means forming a chamber encompassing said pilot burner chamber for conveying unvaporized fuel and the balance of said vaporized fuel from said vaporizing chamber to said main burner and discharging the same therein at a point spaced from the outlet of said combustion air supply means.

5. A heater comprising a main burner, induction means for introducing combustion air into said burner, means forming a pilot burner chamber communicating with said main burner, an igniter communicating with said pilot burner chamber for igniting a combustible mixture therein, fuel supply means for said heater including a vaporizing chamber surrounding said igniter for vaporizing at least a portion of the liquid fuel supplied thereto, means for supplying liquid fuel to said vaporizing chamber, and a passageway surrounding said pilot burner chamber and communicating at opposite ends with said vaporizing chamber and said main burner, means for diverting a portion of the air flowing through said induction means to said pilot burner chamber, means for diverting a portion of the vaporized fuel from said vaporizing chamber and mixing the same with said diverted air to produce a mixture for combustion in said pilot burner chamber including Venturi means in said air diverting means and a conduit forming means for establishing communication between the neck of said Venturi means and the vaporizing chamber.

THELMA McCOLLUM,
*Executrix of the Last Will and Testament of Henry J. DeN. McCollum, Deceased.*

REFERENCES CITED

The following references are of record in the file of this patent:

UNITED STATES PATENTS

| Number | Name | Date |
|---|---|---|
| 980,801 | Kraus | Jan. 3, 1911 |
| 1,349,876 | Doble | Aug. 17, 1920 |
| 1,394,807 | Blanchard | Oct. 25, 1921 |
| 1,394,894 | Good | Oct. 25, 1921 |
| 1,656,486 | Huntington et al. | Jan. 17, 1928 |
| 2,373,766 | McCollum | Apr. 17, 1945 |
| 2,384,836 | Holthouse | Sept. 18, 1945 |
| 2,410,881 | Hunter | Nov. 12, 1946 |
| 2,421,370 | Budlane | June 3, 1947 |